United States Patent [19]

Makowski et al.

[11] 4,118,362

[45] Oct. 3, 1978

[54] PLASTICIZATION OF NEUTRALIZED SULFONATED ELASTOMERIC POLYMER

[75] Inventors: Henry S. Makowski, Scotch Plains; Douglas Brenner, Livingston, both of N.J.

[73] Assignee: Exxon Research & Engineering Co., Linden, N.J.

[21] Appl. No.: 855,554

[22] Filed: Nov. 29, 1977

[51] Int. Cl.$^2$ ................................................ C08K 5/20
[52] U.S. Cl. ............................................... 260/32.6 A
[58] Field of Search ...................... 260/79.3 R, 32.6 A

[56] References Cited

U.S. PATENT DOCUMENTS

B 487,467  4/1976  Lundberg et al. ............ 260/32.6 A
4,014,847  4/1976  Lundberg et al. ............ 260/32.6 A Primary Examiner—Lewis T. Jacobs
Attorney, Agent, or Firm—Richard E. Nanfeldt

[57] ABSTRACT

This invention relates to improved elastomeric compositions of metal and ammonium neutralized sulfonated EPDM terpolymers which are preferentially plasticized with an aliphatic organic amide at a minimum critical concentration level of at least 8 parts by weight based on 100 parts by weight of the metal neutralized EPDM terpolymer, wherein the composition has a balance of improved physical and rheological properties. These compositions can be readily processed due to their superior rheological properties on conventional plastic fabrication equipment.

18 Claims, No Drawings

PLASTICIZATION OF NEUTRALIZED SULFONATED ELASTOMERIC POLYMER

BACKGROUND OF THE INVENTION

1. Field of the Invention

This invention relates to an improved elastomeric composition of metal and ammonium neutralized sulfonated EPDM terpolymers which are preferentially plasticized with an aliphatic organic amide at a minimum critical concentration level of at least 8 parts by weight based on 100 parts by weight of the metal neutralized EPDM terpolymer, wherein the compositions have a balance of improved physical and rheological properties. These compositions can be readily processed due to their superior rheological properties on conventional plastic fabrication equipment.

2. Description of the Prior Art

Recently a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728 herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically crosslinked elastomer having substantially improved physical properties over an unsulfonated elastomer at room temperature. However, these ionically crosslinked elastomers may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of U.S. Pat. No. 3,642,728 are readily usable in a certain number of limited applications, they are not as readily adaptable for the manufacture of an injection moldable elastomeric article such as footwear as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically crosslinked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by the process of U.S. Pat. No. 3,870,841 are not as suitable for the manufacture of high performance elastomeric articles such as footwear formed by an injection molding process as are the compositions of the present invention.

U.S. Pat. No. 3,847,854, teaches a method of improving the processability of neutralized sulfonated elastomeric polymers by the addition of a preferential plasticizer which has at least one functional constituent which exhibits a bond moment whose absolute value is at least 0.6 Debye, and must be a liquid at the desired processing temperature of the neutralized sulfonated elastomeric polymer.

The concentrations of the non-volatile plasticizers are limited to an upper concentration of 6–7 parts by weight because with the metal neutralized sulfonated elastomers of this invention, there would be an adverse plasticization of the polymeric backbone. This invention fails to teach, imply or infer the use of an aliphatic organic amide as a preferential plasticizer at high concentrations; nor does it recognize that only amides of clearly defined structure are operative. The inventive concept of the present invention clearly teaches the use of long chain aliphatic organic amides as a preferential plasticizer at a minimum concentration level of at least about 8 wt. % in order to achieve not only improvements in rheological properties but also improvements in physical properties.

SUMMARY OF THE INVENTION

The present invention relates to improved compositions of metal neutralized sulfonated EPDM terpolymers being preferentially plasticized with about 8 to about 75 parts by weight of a long chain aliphatic organic amide based on 100 parts by weight of the metal neutralized EPDM terpolymer, more preferably about 9 to about 40 and most preferably about 10 to about 30. These compositions have both improved physical and rheological properties previously simultaneously unattainable by the teachings of the prior art. The compositions of the present invention are readily processed due to their superior rheological properties on conventional plastic fabrication equipment into high performance elastomeric articles such as garden hose or elastomeric footwear.

Accordingly, it is an object of our present instant invention to provide unique and novel compositions of metal and ammonium neutralized sulfonated EPDM terpolymer being preferentially plasticized with a long chain aliphatic organic amide thereby providing high performance elastomeric articles which can be formed on conventional plastic fabricating equipment, wherein the compositions can be optionally modified with fillers, extender oils or polyolefinic thermoplastics and mixtures thereof.

GENERAL DESCRIPTION

This present invention relates to unique and novel elastomeric compositions of a metal neutralized sulfonated EPDM terpolymer, being preferentially plasticized with a long chain aliphatic organic amide wherein the compositions exhibit not only a substantial improvement in flow properties but unexpected and substantial improvements in physical properties thereby providing high performance elastomeric articles. Thus, by the addition of high concentrations of specific amides essentially intractable sulfonated polymer can be made to process readily in conventional molding or extrusion operations.

The metal and ammonium neutralized sulfonated elastomeric polymers of this present instant invention are derived from unsaturated polymers which include low unsaturated elastomeric polymers such as Butyl rubber, or EPDM terpolymers.

The expression "Butyl rubber" as employed in the specification and claims is intended to include copolymers made from a polymerization reaction mixture having therein from 70 to 99.5% by weight of an isoolefin which has about 4 to about 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1 + 8, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 45 to about 75 wt. % ethylene, e.g. 50 wt. % and about 2.6 to about 8.0 wt. % diene monomer, e.g. 50 wt. %. The diene monomer is preferably a nonconjugated diene.

Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.) a terpolymer having a Mooney viscosity (ML, 1 + 8, 212° F.) of about 40 and having an ethylene content of about 50 wt. % and a 5-ethylidene-2-norbornene content of about 5.0 wt. %. The $\overline{M}n$ of Vistalon 2504 is about 47,000, the $\overline{M}v$ is about 145,000 and the $\overline{M}w$ is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the Mw is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) of about 10,000 to about 200,000; more preferably of about 15,000 to about 100,000; most preferably of about 20,000 to about 60,000. The Mooney viscosity (ML, 1 + 8, 212° F.) of the EPDM terpolymer is about 5 to about 60, more preferably about 10 to about 50, and most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

One means for carrying out the invention is to dissolve the elastomeric polymer in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the elastomeric polymer and nonreactive solvent at a temperature of about −10° C. to about 100° C. for a period of time of about 1 to about 60 minutes, most preferably at room temperature for about 5 to about 45 minutes, and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium or preformed in a chlorinated aliphatic or aromatic hydrocarbon or in the absence of solvent.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, an aromatic hydroxyl compound, such as phenol, a cycloaliphatic alcohol such as a cyclohexanol, or water. The acid form of the sulfonated elastomeric polymer has about 10 to about 60 meq. $SO_3H$ groups per 100 grams of sulfonated polymer, more preferably about 15 to about 50, and most preferably about 20 to about 40. The meq. of SO$_3$H/100 grams of polymer is determined by both titration of the polymeric sulfonic acid and Dietert Sulfur analysis. In the titration of the sulfonic acid the polymer is dissolved in a solvent consisting of 95 parts of toluene and 5 parts of methanol at a concentration level of 50 grams per liter of solvent. The acid form is titrated with ethanolic sodium hydroxide to an Alizarin-Thymolphthalein endpoint.

Neutralization of the acid form of the sulfonated elastomeric polymer is done, for example, by the addition of a solution of neutralizing agent such as a metal acetate or ammonium bases or amines such as ammonium acetate to the acid form of the sulfonated elastomeric polymer dissolved in the mixture of the aliphatic alcohol and non-reactive solvent. The metal acetate is dissolved in a binary solvent system consisting of water and/or aliphatic alcohol. Typically, but non-limiting metal acetates are sodium acetate, ammonium acetate, barium acetate, magnesium acetate, aluminum acetate, potassium acetate, lead acetate, and zinc acetate, wherein zinc acetate is preferred. Typical amines are the simpler lower molecular weight amines such as methylamine, ethylamine, butylamine, dimethylamine, trimethylamine, cyclohexylamine, piperidine and aniline.

Sufficient neutralizing agent is added to the solution of the acid form of the elastomeric polymer to effect neutralization of the SO$_3$H groups. It is preferable to neutralize at least 95% of the acid groups, more preferably about 98%, most preferably 100%. Metal oxides and hydroxides such as ZnO and Mg(OH)$_2$ can be employed to effect the neutralization of the SO$_3$H groups.

The resultant neutralized sulfonated terpolymer has a melt viscosity which is dependent upon the molecular weight of the base polymer, the level of sulfonation, and the associated cation. An EPDM with an original Mooney viscosity (ML, 1 + 8, 212° F.) of about 55, containing about 40 meq. sulfonate/100g EDPM and possessing cations such as mercury, magnesium, calcium, cobalt, lithium, barium, sodium and the like may disintegrate in a capillary rheometer at 200° C. at a shear rate of 0.73 sec$^{-1}$ and will possess an apparent viscosity in excess of 5 × 10$^6$ poise. An EPDM with an original Mooney viscosity (ML, 1 + 8, 212° F.) of about 20, containing about 30 meq. sulfonate/100 EPDM, and possessing cations such as zinc, lead, and ammonium possesses an apparent viscosity of from about 10$^6$ to about 3.5 × 10$^6$ poise at a shear rate of 0.73 sec$^{-1}$ at 200° C. Lower sulfonate contents with amine salts result in apparent viscosities below 1 × 10$^6$ poise under the same testing conditions.

On the other hand the physical properties of the unplasticized sulfonated and neutralized elastomers improve with increasing sulfonate content. Further metallic cations provide better physical properties than the ammonium or amine cations. Good development of physical properties usually starts to occur when about 20 meq. sulfonate/100 polymer are present, and the physical properties obtained at 30 meq. sulfonate/100 polymer and higher are preferred. However, even at these higher levels of sulfonate the unplasticized neutralized sulfonated elastomers still possess relatively modest physical properties, and the melt viscosities are so high that mixing or processing these gums in the absence of a plasticizer on conventional equipment is extremely difficult if not impossible.

U.S. Pat. No. 3,847,854 addressed itself to the problem of melt processability in metal sulfonate containing elastomers and a large number of materials are claimed as plasticizers that would give the ionomers lower melt viscosities at processing temperatures and thereby permit melt fabrication. However, many of the materials listed are relatively poor flow improvers. This patent also failed to recognize that not only is the functional group of the plasticizer critical in determining its effectiveness but also that the radical or substituent carrying the functional group also is very important. Thus, for example, within the present invention stearamide is an effective preferential plasticizer whereas butyramide and benzamide at the same molar concentration are not. Further U.S. Pat. No. 3,847,854 teaches that the effective flow improvers have an adverse effect on physical properties and therefore cautions against the use of more than 6-7 wt. % of a non-volatile plasticizer above which improvement in melt flow was taught to be associated with a consequent loss in physical properties.

The melt viscosities of some of the systems investigated herein were determined through the use of an Instron Capillary rheometer. The melt viscosity measurements were made at a temperature of 200° C. and at various shear rates corresponding to crosshead speeds from 0.0005 in/min to 20 in/min. The apparent viscosity at 200° C. and at a shear rate of 0.73 sec$^{-1}$ (0.005 in/min) is employed as a characterization parameter of this invention. In addition to the capillary rheometer determinations, measures of melt viscosity on many systems were obtained by determining the melt index at 190° C., generally at 250 psi. Materials possessing a melt index under these conditions of about 0.2 grams/10 min or greater can be considered mixable with plasticizers, fillers, extender oils, and other additives in high intensity, high shear rate mixers. Materials can be considered to be extrudable or injection moldable when they possess a melt index under these conditions of about 5 grams/10 minutes and greater.

It has been found that among a large number of non-volatile functional organic compounds that certain critically selected amides, when added at high concentration levels to a neutralized sulfonated elastomer, result in the combination of markedly improved flow properties and at the same time an extraordinary improvement in physical properties for the sulfonated elastomeric compositions. Contrary to the teachings of U.S. Pat. No. 3,847,854 these select amides exert beneficial tensile property improvements at use temperature in addition to improvements in melt flow with increasing amide level at concentrations far beyond 6-7 parts by weight of amide/100 polymer. In fact, maximum physical property development generally occurs at amide concentrations of about 10 to about 30 parts by weight of amide.

Useful amides for the practice of this invention are those with the general structure:

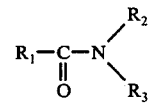

wherein in one instance R$_1$ is essentially a long, preferably straight, chain aliphatic radical containing from about 10 to about 50 carbon atoms and R$_2$ and R$_3$ are independently selected from the groups H, an alkyl group, an aryl group or an aralkyl group such as methyl, butyl, stearyl, behenyl, cyclohexyl, phenyl, tolyl and benzyl. $R_1$ may be unsaturated or contain some branching, but it is most preferably linear and saturated. When in another instance $R_2$ or $R_3$ or both are long chain saturated aliphatic groups $R_1$ is not required to be a long chain aliphatic radical but can be H, an alkyl group, aryl group or aralkyl group.

Alternatively, when $R_2$ is H, $R_3$ can be an organic amide radical having the formula:

wherein X is selected from the group consisting of $-(CH_2)_n-$ or phenylene $(C_6H_4)$ wherein $n > 1$, and $R_4$ is a long aliphatic radical containing from about 10 to about 50 carbon atoms and is preferably linear and saturated. A typical example of such an alkylene-bis amide is ethylene-bis-stearamide.

In order to exhibit the combined improvements in melt processability and physical properties the amides must at least be solids at room temperature and preferably possess melting points of 35° C. and higher, most preferably 70° C. or higher. Liquid amides can be flow improvers but they do not improve physical properties.

The higher molecular weight saturated fatty acid amides such as stearamide, arachidamide, behenamide, N-methylstearamide, ethylene-bis-stearamide, and N-phenylstearamide are readily available and are very effective plasticizers. The lower molecular weight fatty acid amides such as lauramide are useful and effective but generally the longer linear aliphatic chains function more effectively. Unsaturated amides such as oleamide are effective and contemplated within the scope of the invention but generally are not as effective as their saturated counterparts.

The lower molecular weight simple aliphatic amides, such as butyramide, N-ethylacetamide and N,N-dimethylpropionamide do not provide for improved flow and physical properties when used in the same molar concentrations. Also ineffective are the simple aromatic amides such as formanilide, benzamide and N,N-dimethyltoluamide.

In order to achieve a suitable balance of good melt flow and enhanced physical properties it is important to incorporate the amide into the neutralized sulfonated elastomer at about 8 to about 75 parts by weight per hundred of the sulfonated polymer, more preferably at about 9 to about 50, and most preferably at about 10 to about 30.

Elastomers containing metal and ammonium sulfonate groups tend to absorb water. This tendency varies with the concentration of sulfonate groups, with the cation type, and with the concentration of the agent used to neutralize the sulfonic acid. Resistance to water absorption is best with the zinc and lead cations and when about 2 meq. of metal acetate/meq. $SO_3H$ is used for neutralization. All of the unplasticized gums are significantly improved in moisture resistance through the use of the effective amide plasticizers of this invention.

Water absorption can be measured in an accelerated procedure through the immersion of a thin (0.02 inch) sheet in water at 50° C. and measuring the weight of water picked up as a function of time. Those elastomeric gums absorbing less than 15 weight % water after 300 hours under these conditions are considered to have acceptable, if not good, moisture resistance.

Improvements in flow and physical properties by the addition of high concentration of a selected amide of a sulfonated elastomer have been found to be obtainable with a plurality of cations. Unexpectedly even the ammonium sulfonates respond very well to result in improved physical properties. Of the many useful cations Zn, Pb, Ba, Mg, K, and Na are preferred. Most preferred are the Zn and Ba sulfonates which provide amide plasticized gums with exceptional physical properties and ready melt processability.

The amides can be incorporated into the unplasticized gums in a number of ways. A convenient method is the addition of the amide to the cement of the sulfonated and neutralized polymer prior to its isolation during the manufacturing process. The resultant plasticized polymer still has sufficiently high viscosity and integrity that it can be easily and conveniently dried in a tumble dryer or fluid dryer with hot air at for example 100° C. Yet the plasticized polymer can be made to possess sufficiently low viscosity so that it may be dewatered and dried in a dewatering extruder.

Amides can also be added to the gums through the solution of already isolated and dried unplasticized gums and the addition of the amide to this solution. The resultant blend is isolated in the usual manner. Alternatively in cases where the unplasticized gums do not possess a very high viscosity, as for example a melt viscosity of about $10^6$ poise at 200° C. and a shear rate of $0.73$ $sec^{-1}$ it is relatively easy to flux the gum and the amide in high intensity high shear mixers such as Banbury mixers and Farrell continuous mixers.

EXAMPLE 1

Six separate solutions were prepared by dissolving 800g of a 20 Mooney (ML, 1 + 8, 212° F.) EPDM in 8000 ml. of Exxon hexane. The EPDM contained about 50 weight % ethylene and about 5 weight % 5-ethylidene-2-norbornene and was obtained through extruder breakdown of a 40 Mooney (ML, 1 + 8, 212° F.) commercial Vistalon 2504. Acetic anhydride was added, and then concentrated sulfuric acid (37.5 mmoles $H_2SO_4$/100 EPDM and acetic anhydride/$H_2SO_4$ = 1.62) was dripped in at room temperature. The sulfonation mixture was stirred for 30 minutes and then inactivated and simultaneously neutralized through the addition of a solution of $Zn(OOCCH_3)_2 \cdot 2H_2O$ (2.4 meq./mmole $H_2SO_4$) in 640 ml. methanol/24 ml. water. Irganox 1010 (0.8g) was added, and the mixture was stirred for 30 minutes. The cement was steam stripped to isolate the polymer. The polymer was pulverized and washed with water in A waring blender, and the wet crumb was dried on a rubber mill at about 210° F. The dried polymers were analyzed for sulfur and for zinc. Results are given in Table I.

The tensile properties at room temperature and at 70° C. of the zinc sulfonate products were determined on micro-dumbbells at a rate of 2 inches/minute. Melt index was determined at 190° C. at 250 psi. The melt viscosities were determined through the use of an Instron Capillary Rheometer at a temperature of 200° C. and at various shear rates. The results are given in Table II.

The tensile data show that physical properties indeed are improved as the sulfonate content increases; however, these improvements in physical properties are achieved at a substantial sacrifice of flow properties.

Indeed at the higher sulfonate levels it is no longer a question of whether the gums can be processed of themselves, but whether they can be mixed thoroughly with fillers and oils.

TABLE I

| Example | mmoles H$_2$SO$_4$/ 100 EPDM | Weight % S | Sulfonate Content meq./100 EPDM | Weight % Zn |
|---|---|---|---|---|
| 1-A | 22.5 | 0.62 | 19.5 | 1.48 |
| 1-B | 27.5 | 0.74 | 23.3 | 1.75 |
| 1-C | 32.5 | 0.82 | 26.1 | 1.98 |
| 1-D | 37.5 | 0.97 | 31.2 | 2.28 |
| 1-E | 42.5 | 1.16 | 37.4 | 2.79 |
| 1-F | 47.5 | 1.35 | 43.7 | 2.84 | were isolated by steam stripping and drying on an eight-inch rubber mill at about 210° F.

Tensile properties at room temperature and 70° C. and melt index at 190° C. and 250 psi were determined on each plasticized polymer. The results are given in Table IV.

It is readily apparent that 90 meq. stearamide/100 EPDM exerts a dramatic improvement in flow (cf Tables II and IV). Even more dramatic are the improvements seen in physical properties at room temperature and at 70° C. Thus even though flow is markedly improved it is not obtained at the expense of physical properties.

TABLE III

| | | ARMID AMIDES* | | | |
|---|---|---|---|---|---|
| Amide | Carbon Chain Length | Armid 18 | Armid HT | Armid C | Armid O |
| AVERAGE COMPOSITION (%) | | | | | |
| Octanamide | 8 | | | 8 | |
| Decanamide | 10 | | | 7 | |
| Dodecanamide | 12 | | | 49 | |
| Tetradecanamide | 14 | | 2.0 | 17 | 4.5 |
| Pentadecanamide | 15 | | 0.5 | | 0.5 |
| Hexadecanamide | 16 | 7 | 22 | 9 | 9.5 |
| Heptadecanamide | 17 | 2.5 | 1.5 | | 1.0 |
| Octadecanamide | 18 | 86.5 | 71 | 2 | Trace |
| 9-Octadecenamide | 18 | 4 | 3 | 6 | 79.5 |
| 9–12 Octadecadienamide | 18 | | | 2 | 4.0 |
| Others | | | | | 1.0 |
| SPECIFICATIONS | | | | | |
| Amide %, min. | | 90 | 90 | 90 | 90 |
| Iodine Value min. | | — | — | — | 80 |
| max. | | 2 | 5 | 10 | 95 |
| Free Fatty Acid %, max. | | 5 | 5 | 4 | 3.5 |

*From Armak Product Data Bulletin No. 73–5.

TABLE IV

ZINC SULFONATE EPDM GUMS PLASTICIZED WITH 90 MEQ. STEARAMIDE

| | | | Room Temperature | | | 70° C | | |
|---|---|---|---|---|---|---|---|---|
| Example | Sulfonate Meq./100 EPDM | Melt Index g/10 min. | 300% Modulus, psi | Tensile Strength, psi | Elong., % | 300% Modulus, psi | Tensile Strength, psi | Elong., % |
| 2-A | 19.5 | 13.3 | 460 | 1550 | 640 | 105 | 110 | 570 |
| 2-B | 23.3 | 10.6 | 450 | 1440 | 570 | 140 | 180 | 620 |
| 2-C | 26.1 | 7.1 | 585 | 3630 | 630 | 170 | 390 | 800 |
| 2-D | 31.2 | 5.2 | 670 | 4450 | 620 | 180 | 590 | 900 |
| 2-E | 37.4 | 3.5 | 880 | 4050 | 550 | 190 | 640 | 870 |
| 2-F | 43.7 | 2.4 | 1010 | 4760 | 570 | 230 | 930 | 860 |

TABLE II

UNPLASTICIZED ZINC SULFONATE EPDM GUMS

| | | | Room Temperature | | | 70° C | | | | Shear Rate |
|---|---|---|---|---|---|---|---|---|---|---|
| Example | Sulfonate meq./100 EPDM | Melt Index g/10 min. | 300% Modulus, psi | Tensile Strength, psi | Elong., % | 300% Modulus, psi | Tensile Strength, psi | Elong., % | Viscosity at 0.73 sec$^{-1}$ poise $\times$ 10$^{-5}$ | at Melt Fracture, sec$^{-1}$ |
| 1-A | 19.5 | 0.41 | 320 | 790 | 520 | 140 | 140 | 300 | 7.9 | 728 |
| 1-B | 23.3 | 0.28 | 370 | 1140 | 560 | 170 | 170 | 320 | 10.2 | 291 |
| 1-C | 26.1 | 0.14 | 480 | 1240 | 510 | — | 220 | 290 | 15.2 | 146 |
| 1-D | 31.2 | 0.10 | 645 | 1520 | 500 | — | 290 | 290 | 22.6 | 29.1 |
| 1-E | 37.4 | 0.06 | 720 | 1960 | 460 | — | 390 | 310 | 25.2 | 29.1 |
| 1-F | 43.7 | 0.03 | 890 | 2300 | 480 | — | 440 | 310 | 33.5 | 14.5 |

EXAMPLE 2

Armid 18 is predominantly stearamide (86.5%). Its full composition is given in Table III.

The polymers of Example 1 were mixed with 25.5g (90 meq.) of Armid 18 stearamide as follows: 25.0g of the polymer was dissolved in 250 l ml. of 95 toluene/5 methanol. The amide was added and stirring was continued until a good dispersion was obtained. The blends

EXAMPLE 3

According to the procedure described in Example 2, the zinc sulfonate EPDM gum containing 31.2 meq. sulfonate/100 EPDM (Example 1-D) was mixed with Armid 18 stearamide at the following levels/100 polymer:

| Mmoles | Weight, g |
|---|---|
| 30 | 8.5 |
| 60 | 17.0 |
| 90 | 25.5 |

-continued

| Mmoles | Weight, g |
| --- | --- |
| 120 | 34.0 |
| 150 | 42.5 |
| 180 | 51.0 |
| 270 | 76.5 |

Tensile properties at room temperature and 70° C. and melt index at 190° C. and 250 psi are given in Table V.

Marked increases in flow were obtained with increasing stearamide concentration. Physical properties also improved to a maximum at about 90 mmoles stearamide/100 EPDM and then fell off. But even at 150 mmoles stearamide (42.5 parts/100 polymer) tensile properties were still better than the unplasticized gum yet with tremendously improved flow properties.

TABLE V
EFFECT OF STEARAMIDE CONCENTRATION ON ZINC SULFONATE EPDM GUM

| | Stearamide Added/100 EPDM | | Melt Index | Room Temperature | | | 70° C | | |
| --- | --- | --- | --- | --- | --- | --- | --- | --- | --- |
| Example | Mmoles | Weight, g | g/10 min. | 300% Modulus, psi | Tensile Strength, psi | Elong., % | 300% Modulus, psi | Tensile Strength, psi | Elong., % |
| 1-D | 0 | 0 | 0.1 | 645 | 1520 | 500 | — | 290 | 290 |
| 3-A | 30 | 8.5 | 0.35 | 790 | 3060 | 520 | 190 | 320 | 640 |
| 3-B | 60 | 17.0 | 1.6 | 740 | 3630 | 580 | 190 | 550 | 800 |
| 3-C | 90 | 25.5 | 5.2 | 670 | 4450 | 620 | 180 | 590 | 900 |
| 3-D | 120 | 34.0 | 12.3 | 760 | 2600 | 510 | 180 | 520 | 860 |
| 3-E | 150 | 42.5 | 18.3 | 630 | 1980 | 510 | 190 | 410 | 830 |
| 3-F | 180 | 51.0 | 22.0 | 540 | 1130 | 500 | 190 | 420 | 800 |
| 3-G | 270 | 76.5 | >>25.0 | 380 | 620 | 440 | 170 | 210 | 560 |

EXAMPLE 4

The zinc sulfonate polymer of Example 1-D containing 31.2 meq. sulfonate/100 EPDM was mixed with 25.5g each of Armid C, which is largely dodecanamide, and Armid O, which is largely the unsaturated amide, 9-octadecenamide, according to the procedures in Example 2. Details of the compositions of these amides are given in Table III. The results of these plasticizations are given in Table VI.

Improvements in flow and room temperature physical properties were obtained with the lower molecular weight (about $C_{12}$) saturated fatty acid amide. Amide O, 9-octadecenamide, the unsaturated counterpart to the saturated Armid 18 stearamide improves flow and room temperature tensile properties; however, tensile properties at 70° C. are deficient. Thus lower molecular weight fatty acid amides and unsaturated fatty acid amides are less preferred than those which are high in molecular weight and which are saturated.

dripped into the cement. After 30 minutes a sample of cement was taken for sulfur analysis, and the free polymeric sulfonic acid was isolated by steam stripping. After washing and drying the polymeric free acid was found to contain 1.13 weight % sulfur which corresponds to a sulfonic acid content of 36.3 meq./100 EPDM.

Immediately after sampling the cement was neutralized with a solution of 49.3g (450 meq.) of $Zn(OOCCH_3)_2 \cdot 2H_2O$ (90 meq. zinc acetate/100 EPDM) dissolved in 318g methanol and 15g of distilled water. Irganox 1010 (0.5g) was added, and the resultant cement was stirred for 60 minutes.

To three portions of cement weighing 439g each and corresponding to 50g EPDM were added Armid 18 (stearamide) as follows:

| Example | Weight, g | Meq. Stearamide/100 EPDM |
| --- | --- | --- |
| 5-A | 4.25 | 30 |
| 5-B | 8.50 | 60 |
| 5-C | 12.75 | 90 |

After the Armid 18 was fully dispersed the plasticized polymers were isolated by steam stripping, pulverizing and washing with water in a Waring blender, and drying the wet crumb on a rubber mill at about 210° C.

The remaining unplasticized cement was also isolated by steam stripping, washing and mill drying. Three solutions of the dried, unplasticized product were prepared by dissolving 51.9g of polymer (equivalent to 50g EPDM) in 475 ml. toluene/25 ml. methanol. To each solution Armid 18 was added as follows:

| Example | Weight, g | Meq. Stearamide/100 EPDM |
| --- | --- | --- |
| 5-D | 4.25 | 30 |
| 5-E | 8.50 | 60 |
| 5-F | 12.75 | 90 |

TABLE VI
EFFECT OF FATTY ACID AMIDE TYPE ON ZINC SULFONATE EPDM GUMS

| | | Melt Index | Room Temperature | | | 70° C | | |
| --- | --- | --- | --- | --- | --- | --- | --- | --- |
| Example | Amide | g/10 min. | 300% Modulus, psi | Tensile Strength, psi | Elong., % | 300% Modulus, psi | Tensile Strength, psi | Elong., % |
| 1-D | None | 0.10 | 645 | 1520 | 500 | — | 290 | 290 |
| 2-D | Armid 18 | 5.2 | 670 | 4450 | 620 | 180 | 590 | 900 |
| 4-A | Armid C | 4.2 | 520 | 3020 | 580 | 20 | 10 | 450 |
| 4-B | Armid O | 5.5 | 350 | 2440 | 640 | 10 | 10 | 370 |

EXAMPLE 5

Five hundred grams of the 20 Mooney (ML, 1+8, 212° F.) EPDM described in Example 1 were dissolved in 3453g of Exxon hexane. To the cement at room temperature was added 304 mmoles of acetic anhydride, and then 188 mmoles of concentrated sulfuric acid was These plasticized cements were isolated as described above.

Tensile properties at both room temperature and 70° C. and melt index (190° C., 250 psi) were determined on each of the samples. The results are given in Table VI.

The data in Example 1 show that an unplasticized zinc sulfonate 20 Mooney 2504 has a melt index at 190° C. and 250 psi of less than 0.1 g/10 minutes. The data in this example show that the addition of stearamide to the polymer brings about a substantial improvement in flow, and yet the improved flow is achieved at no sacrifice in physical properties. In fact the tensile properties at both room temperature and 70° C. are substantially improved.

This example further shows that the stearamide can be added to the polymer cement prior to isolation or it can be post added to the isolated polymer. Equivalent properties are obtained in either case.

of $Zn(OOCCH_3)_2.2H_2O$ (150 meq./100 EPDM) was used for the neutralization rather than 90 meq./100 EPDM. The tensile properties and melt indices are given in Table VIII.

This example demonstrates the use of 150 meq. of zinc acetate neutralizing agent/100 EPDM. The data show that ambient temperature tensile strengths of greater than 4500 psi are achievable with stearamide plasticizer with excellent 70° C. physical properties and excellent flow.

TABLE VIII

| Example | Armid 18 Added to | Melt Index g/10 min. | Room Temperature | | | 70° C. | | |
|---|---|---|---|---|---|---|---|---|
| | | | 300% Modulus, psi | Tensile Strength, psi | Elong., % | 300% Modulus, psi | Tensile Strength, psi | Elong., % |
| 7-A | Sulfonated Cement | 0.69 | 1220 | 3560 | 510 | 110 | 200 | >1200 |
| 7-B | " | 1.65 | 1280 | 4460 | 530 | 110 | 270 | >1200 |
| 7-C | " | 4.26 | 1150 | 3880 | 510 | 120 | 380 | 1010 |
| 7-D | Isolated Polymer | 0.45 | 1110 | 4390 | 530 | 160 | 450 | 870 |
| 7-E | " | 1.99 | 1090 | 4710 | 540 | 150 | 550 | 990 |
| 7-F | " | 5.44 | 1050 | 4685 | 530 | 150 | 630 | 1050 |

TABLE VI

| Example | Armid 18 Added To | Melt Index g/10 min. | Room Temperature | | | 70° C | | |
|---|---|---|---|---|---|---|---|---|
| | | | 300% Modulus, psi | Tensile Strength, psi | Elong., % | 300% Modulus, psi | Tensile Strength, psi | Elong., % |
| 5-A | Sulfonated Cement | 0.48 | 815 | 2330 | 500 | 105 | 180 | 1180 |
| 5-B | " | 1.36 | 820 | 3310 | 530 | 140 | 330 | 950 |
| 5-C | " | 4.10 | 910 | 3980 | 535 | 150 | 545 | 1000 |
| 5-D | Isolated Polymer | 0.35 | 960 | 2800 | 500 | 160 | 450 | 870 |
| 5-E | " | 1.60 | 1040 | 3600 | 500 | 165 | 650 | 950 |
| 5-F | " | 5.30 | 1050 | 3250 | 500 | 160 | 600 | 970 |

EXAMPLE 6

A series of Armid 18 plasticized zinc sulfonated 20 Mooney V-2504 gums was prepared in identical fashion to Example 5 with the exception that 65.8g (600 meq) of $Zn(OOCCH_3)_2.2H_2O$ (120 meq/100 EPDM) was used for the neutralization rather than 90 meq/100 EPDM. The tensile properties and melt indices are given in Table VII.

This example illustrates the use of 120 meq. of zinc acetate neutralizing agent per 100 EPDM gives essentially the same results as a system derived from the use of 90 meq. zinc acetate/100 EPDM.

EXAMPLE 8

Metal sulfonate containing polymers tend to absorb moisture. Moisture absorption is a function of sulfonate content, metal counterion and the concentration of metal acetate.

Stearamide (Armid 18) improves the moisture resistance of zinc sulfonate EPDM's. Data are shown in Table IX. Weight pick up was measured after immersion in water at 50° C.

Unplasticized zinc sulfonate EPDM of itself will absorb water. The greater the concentration of zinc acetate used to neutralize the polymer during preparation the greater is the water pick up. As the amount of zinc acetate is increased from 90 to 150 meq zinc acetate/100 EPDM the greater is the water absorption.

TABLE VII

| Example | Armid 18 Added To | Melt Index g/10 min. | Room Temperature | | | 70° C | | |
|---|---|---|---|---|---|---|---|---|
| | | | 300% Modulus, psi | Tensile Strength, psi | Elong., % | 300% Modulus, psi | Tensile Strength, psi | Elong., % |
| 6-A | Sulfonated Cement | 0.76 | 890 | 2660 | 510 | 100 | 140 | >1200 |
| 6-B | " | 1.36 | 940 | 3620 | 530 | 140 | 390 | 1000 |
| 6-C | " | 4.44 | 890 | 4030 | 550 | 120 | 310 | 1050 |
| 6-D | Isolated Polymer | 0.38 | 1030 | 3000 | 500 | 180 | 470 | 770 |
| 6-E | " | 1.77 | 1300 | 4340 | 520 | 150 | 530 | 970 |
| 6-F | " | 5.50 | 1300 | 4500 | 520 | 160 | 540 | 920 |

EXAMPLE 7

A series of Armid 18 plasticized zinc sulfonate 20 Mooney V-2504 gums was prepared in identical fashion to Example 5 with the exception that 82.2g (750 meq.)

When stearamide is added as a plasticizer the water pick up is reduced substantially. This is an added benefit of the use of the amides of this invention as plasticizers in metal sulfonate containing polymers.

TABLE IX
WATER SENSITIVITY

| Example | Neutralized with Meq. Zn(OAc)$_2$/100 EPDM | Stearamide Mmoles/100 EPDM | % Water Pick Up After 311 Hours at 50° C |
|---|---|---|---|
|  | 90 | 0 | 15.3 |
| 5-A | 90 | 30 | 13.6 |
| 5-B | 90 | 60 | 11.0 |
| 5-C | 90 | 90 | 10.3 |
|  | 120 | 0 | 18.7 |
| 6-A | 120 | 30 | 13.6 |
| 6-B | 120 | 60 | — |
| 6-C | 120 | 90 | 19.0 |
|  | 150 | 0 | 25.6 |
| 7-A | 150 | 30 | 16.5 |
| 7-B | 150 | 60 | 15.5 |
| 7-C | 150 | 90 | 14.2 |

EXAMPLES 9 AND 10

The lead (Pb$^{+2}$) and sodium salts of sulfonated EPDM were prepared according to the general procedure described in Example 1 from a 20 Mooney EPDM containing about 55 weight % ethylene and about 5 weight % 5-ethylidene-2-norbornene. The lead salt was prepared using 37.5 mmoles H$_2$SO$_4$/100 EPDM, while the sodium salt was prepared using 22.5 mmoles H$_2$SO$_4$/100 EPDM. The corresponding acetates were utilized for neutralization at a ratio of 2.4 meq metal acetate/mmole H$_2$SO$_4$. The lead salt contained 35.6 meq sulfonate/100 EPDM, and the sodium salt 20.4 meq/100 EPDM.

To each of these neutralized polymers was added 90 mmoles (25.5g) and 180 mmoles (51.0g) of Armid 18 stearamide per 100 of polymer according to the procedure of Example 2. The tensile properties at room temperature and 70°0 C. and melt index at 190° C. and 250 psi are given in Table X.

The lead salt, containing 35.6 meq sulfonate/100 EPDM, exhibited marked improvements in all respects with the addition of stearamide, i.e., room temperature and 70° C. tensiles and melt index.

The sodium salt, containing only 20.4 meq sulfonate/100 EPDM when plasticized with stearamide exhibited a very large increase in flow and a modest increase in room temperature tensile properties. These data demonstrate that higher sulfonate contents are indeed preferred to achieve good hot tensile properties.

EXAMPLES 11 AND 12

The barium and ammonium salts of sufonated EPDM were prepared according to the general procedure described in Example 1 from a 20 Mooney EPDM containing about 55 weight % ethylene and about 5 weight % 5-ethylidene-2-norbornene, except that 32.5 mmoles H$_2$SO$_4$/100 EPDM was used. The corresponding acetates were used for neutralization at a ratio of 2.4 meq acetate/mmole H$_2$SO$_4$. The barium salt contained 31.1 meq sulfonate/100 EDPM while the ammonium salt contained 29.9 meq/100 EPDM.

To these neutralized polymers was added 90 mmoles (25.5g) and 180 mmoles (51.0g) of Armid 18 stearamide per 100 of polymer according to the procedure of Example 2. The tensile properties at room temperature and 70° C. and melt index at 190° C. and 250 psi are given in Table X.

The unplasticized barium salt could not be molded into a flaw-free acceptable tensile test pad even at 450° F. No flow was observed in the melt index test. However, barium salts have been shown to possess gum tensile properties about the same as zinc salts. When Armid 18 stearamide was added to the barium gum, remarkable improvements in room temperature and 70° C. tensiles were obtained. Of course, flow properties were substantially improved.

The ammonium salt exhibited a sharp improvement in room temperature tensile properties along with a dramatic increase in melt index.

TABLE X
EFFECT OF STEARAMIDE ON DIFFERENT CATIONS

| Example | Cation | Sulfonate Content, meq./100 EPDM | Stearamide Added/100 EPDM Mmoles | Stearamide Added/100 EPDM Weight, g | Melt Index g/10 min. | Room Temperature 300% Modulus, psi | Room Temperature Tensile Strength, psi | Room Temperature Elong., % | 70° C 300% Modulus, psi | 70° C Tensile Strength, psi | 70° C Elong., % |
|---|---|---|---|---|---|---|---|---|---|---|---|
| 9 | Pb | 35.6 | 0 | 0 | 0 | 820 | 910 | 310 | — | 300 | 190 |
| 9-A | Pb | 35.6 | 90 | 25.5 | 2.1 | 770 | 3310 | 520 | 200 | 590 | 700 |
| 9-B | Pb | 35.6 | 180 | 51.0 | 28.4 | 510 | 1880 | 550 | 190 | 540 | 770 |
| 10 | Na | 20.4 | 0 | 0 | 0 | 290 | 530 | 500 | — | 170 | 780 |
| 10-A | Na | 20.4 | 90 | 25.5 | 11.7 | 320 | 970 | 630 | 10 | 80 | 360 |
| 10-B | Na | 20.4 | 180 | 51.0 | 4.8* | 280 | 540 | 720 | — | 60 | 210 |
| 11 | Ba | 31.1 | 0 | 0 | 0 | — | — | — | — | — | — |
| 11-A | Ba | 31.1 | 90 | 25.5 | 0.45 | 1115 | 6100 | 540 | 350 | 740 | 550 |
| 11-B | Ba | 31.1 | 180 | 51.0 | 8.9 | 850 | 3510 | 500 | 400 | 1070 | 630 |
| 12 | NH$_4$ | 29.9 | 0 | 0 | 0.32 | 290 | 1150 | 670 | 180 | 250 | 610 |
| 12-A | NH$_4$ | 29.9 | 90 | 25.5 | 3.3 | 620 | 4500 | 560 | 120 | 110 | 590 |
| 12-B | NH$_4$ | 29.9 | 180 | 51.0 | 24.7 | 430 | 2190 | 590 | 70 | 60 | 490 |

*At 43 psi.

EXAMPLE 13

A zinc sulfonate 20 Mooney (ML, 1+8, 212° F.) V-2504 was prepared as described in Example 5. The neutralized product contained 1.08 weight % sulfur corresponding to a sulfonate content of 35.1 meq/100 EPDM.

Solutions were prepared from the dried product polymer by dissolving 52g (equivalent to 50g EPDM) in 475 ml toluene/25 ml methanol. N-butylacetamide, N,N-dibutylpropionamide, and stearamide (Armid 18) were added at levels of 30, 60 and 90 mmoles/100 EPDM. The plasticized polymers were worked up as described in Example 5. Tensile properties and melt indices were determined. Results are given in Table XI.

It is clear that the lower amides, N-butylacetamide and N,N-dibutylpropionamide, when added to the cement prior to steam stripping do nothing to improve either the physical properties or the flow properties of the zinc sulfonate gum. On the other hand stearamide effects a dramatic increase in physical properties and at the same time markedly improves flow properties.

The lower aliphatic carboxylic acid amides are not useful in this invention as distinct from the fatty acid amides and higher linear, long chain aliphatic amides.

three amines, octadecylamine, N-methyloctadecylamine, and N,N-dimethyloctadecylamine, an alcohol, octadecanol, a urea, octadecylurea, and two amides, stearamide and N-methylstearamide.

To a zinc sulfonate 20 Mooney V-2504 containing 35.8 meq sulfonate/100 EPDM was added 60 mmoles of the above described plasticizers according to the procedure described in Example 5. Data are given in Table XIII.

It is fruitful to compare the properties to those of stearic acid as a basis. Stearic acid provides for good flow, but the properties are relatively low at room tem-

TABLE IX

| Example | Amide | Conc.,* Mmoles/ 100 EPDM | Melt Index g/10 min. | Room Temperature | | | 70° C | | |
|---|---|---|---|---|---|---|---|---|---|
| | | | | 300% Modulus, psi | Tensile Strength, psi | Elong., % | 300% Modulus, psi | Tensile Strength, psi | Elong., % |
| 13-A | N-Butylacetamide | 30 | — | 990 | 1520 | 400 | — | 350 | 190 |
| 13-B | " | 60 | — | 895 | 1390 | 410 | — | 340 | 195 |
| 13-C | " | 90 | 0.008 | 910 | 1470 | 405 | — | 310 | 200 |
| 13-D | N,N-Dibutylpropionamide | 30 | 0.04 | 650 | 1640 | 500 | — | 275 | 260 |
| 13-E | " | 60 | 0.10 | 400 | 1060 | 530 | — | 165 | 195 |
| 13-F | " | 90 | 0.05 | 590 | 1170 | 465 | — | 275 | 270 |
| 13-G | Stearamide (Armid 18) | 30 | — | 880 | 3530 | 520 | 160 | 420 | 850 |
| 13-H | " | 60 | 1.49 | 860 | 4345 | 545 | 170 | 505 | 905 |
| 13-I | " | 90 | 4.80 | 860 | 4230 | 550 | 170 | 620 | 980 |

*Amount of Amide added to solution

EXAMPLE 14

To the polymer described in Example 13 according to the procedures described in Example 13 were added N-ethylformanilide, N,N-diethyl-m-toluamide, and N,N,N',N'-tetraethylphthalamide at levels of 30, 60 and 90 mmoles/100 EPDM. Results are given in Table XII. None of these amides, which can be described as essentially aromatic in nature, functioned at any of the levels to either improve physical properties or to improve flow properties. It is clear that such essentially aromatic amides do not function as the long chain aliphatic amides of this invention.

perature and extremely poor at 70° C. The esters give poorer flow and very poor room temperature properties. The amines provide excellent flow, but do not give physical properties comparable to the amide systems. In addition, octadecanol gives very poor flow and no improvement in physicals at all. Octadecylurea provides for better flow, but its physical properties are not comparable to those of amide systems.

The amides alone stand out in providing for improved physical properties, while at the same time possessing outstandingly low melt viscosities thereby providing the proper balance of physical and rheological properties.

TABLE XII

| Example | Amide | Conc.,* Mmoles/ 100 EPDM | Melt Index g/10 min. | Room Temperature | | | 70° C | | |
|---|---|---|---|---|---|---|---|---|---|
| | | | | 300% Modulus, psi | Tensile Strength, psi | Elong., % | 300% Modulus, psi | Tensile Strength, psi | Elong., % |
| 14-A | N-ethylformanilide | 30 | — | 920 | 1470 | 400 | — | 360 | 210 |
| 14-B | " | 60 | — | 1030 | 1710 | 400 | — | 360 | 220 |
| 14-C | " | 90 | 0.006 | 1050 | 1560 | 400 | — | 320 | 180 |
| 14-D | N,N-diethyl-m-toluamide | 30 | — | 880 | 1590 | 415 | — | 230 | 190 |
| 14-E | " | 60 | — | 710 | 1890 | 470 | — | 320 | 220 |
| 14-F | " | 90 | 0.018 | 670 | 1610 | 460 | — | 270 | 185 |
| 14-G | N,N,N',N'-tetraethyl phthalamide | 30 | — | 545 | 1330 | 470 | — | 150 | 280 |
| 14-H | " | 60 | — | — | 1240 | 520 | — | 100 | 225 |
| 14-I | " | 90 | 0.042 | 360 | 910 | 515 | — | 105 | 330 |

*Amount of amide added to solution

EXAMPLE 15

In previous examples the efficacy of fatty acid amides has been shown. Similarly, it has been shown that the lower aliphatic carboxylic acid amides and amides which are substantially aromatic in nature are not operating according to this invention.

In this example a variety of saturated straight chain $C_{18}$ derivatives, varying only in the functional group at the end of the chain, were evaluated as plasticizers in a zinc sulfonate 20 Mooney (ML, 1 + 8, 212° F.) V-2504. The following materials were evaluated both in terms of tensile properties and melt viscosities in an Instron capillary rheometer at 200° C.: a carboxylic acid, stearic acid, two esters, methyl stearate and butyl stearate, These data clearly show that the functional group on a saturated linear alkyl chain in the fatty acid range ($C_{10}$ and greater) is extremely important in determining the efficacy of a plasticizer. Some functional groups in fact work well as "flow improvers"; for example, stearic acid itself is a good flow improver; however, the physical properties of such a plasticized gum are not very good. Other functional groups, such as the alcohol group, help neither the flow nor the physicals (compared to stearic acid). Other functional groups, such as the esters, might help hot tensile properties, but do not help flow nor ambient temperature properties. The amide group alone stands out as that which provides for not only improved flow but also markedly improved physical properties.

TABLE XIII

| | | Room Temperature | | | 70° C | | | Viscosity at 0.73 sec$^{-1}$ poise × 10$^{-5}$ | Shear Rate at Melt Fracture sec$^{-1}$ |
|---|---|---|---|---|---|---|---|---|---|
| Example | Plasticizer | 300% Modulus, psi | Tensile Strength, psi | Elong., % | 300% Modulus, psi | Tensile Strength, psi | Elong., % | | |
| 15-A | Butyl Stearate | 480 | 1130 | 545 | 140 | 160 | 375 | 6.7 | 728 |
| 15-B | Methyl Stearate | 540 | 1110 | 510 | 190 | 210 | 360 | 10.0 | 146 |
| 15-C | Stearic Acid | — | 1670 | 590 | — | 60 | >800 | 8.6 | 728 |
| 15-D | Octadecylamine | 200 | 970 | 650 | — | 5 | 845 | 9.2 | 728 |
| 15-E | N-Methyloctadecyl Amine | 70 | 330 | >1500 | — | 5 | 540 | 1.9 | 2911 |
| 15-F | N,N-Dimethyloctadecyl Amine | 90 | 760 | >1500 | 13 | 5 | 490 | 1.5 | 1456 |
| 15-G | Octadecanol-1 | 620 | 1790 | 510 | — | 30 | 1140 | 18.8 | 15 |
| 15-H | Octadecylurea | 390 | 2035 | 590 | — | 20 | 1095 | 3.7 | 2911 |
| 15-I | Stearamide | 810 | 3900 | 540 | 170 | 550 | 895 | 5.5 | 2911 |
| 15-J | N-Methylstearamide | 800 | 3190 | 510 | 90 | 100 | 995 | 3.7 | 2911 |

EXAMPLE 16

Butyl 365 (100g) was dissolved in 1500 ml of Exxon hexane. To the cement at room temperature was added 36.5 mmoles acetic anhydride followed by 22.5 mmoles of concentrated sulfuric acid. After 30 minutes the sulfonation was deactivated with 150 ml isopropanol. The resultant cement was then neutralized with a solution of 5.8g (54 meq) of $Mg(OOCCH_3)_2.2H_2O$ in 25 ml water. The neutralized polymer was isolated by steam stripping and washing with water in a Waring blender. The wet crumb was dried on a rubber mill at about 210° F. The polymer contained 12.0 meq sulfonate/100 Butyl.

To this polymer was added 90 mmoles (25.5g) of Armid 18 stearamide/100 polymer. Tensile and flow properties are given in Table XIV. An extraordinary improvement in flow properties was obtained illustrating the beneficial effect of stearamide. No improvement in physical properties was obtained. This example further illustrates the need for higher sulfonate contents to achieve simultaneous improvements in flow and physical properties.

This blend was added to a Brabender Plasticorder having a 60 cc. mixing head with Banbury mixers. The material was mixed at 160° C. and 50 RPM. Very rapidly the material fused into a coherent melt which mixed very well in the mixing head and resulted in excellent dispersion of the additive. Six minutes after the addition of the blend to the mixer had been completed, mixing was terminated. Then the material was sheeted out by a single pass through a two-roll mill.

Test pads were made from the prepared samples by compression molding at 350° F. Microdumbbells having a thickness of about 0.6 mm were cut from the test pads and were stored in closed dry bottles for one or more days prior to tensile testing.

Tensile strengths of the samples were measured with an Instron TM table model instrument, using a pulling speed of 51 mm per minute. Measurements were made at room temperature, and also at 70° C. to determine the usefulness of the materials at elevated temperature.

Melt flow rates for the various materials were determined at 190° C. The melt index instrument specified in ASTM 1238-70 was used, with the standard capillary. The weight of the probe plus the added weight was 12.5 kilograms. Flow rates were measured electronically as

TABLE XIV
EFFECT OF STEARAMIDE ON SODIUM SULFONATE BUTYL 365

| | Stearamide Added/100 EPDM | | Melt Index | Room Temperature | | | 70° C | | |
|---|---|---|---|---|---|---|---|---|---|
| Example | Mmoles | Weight, g | g/10 min. | 300% Modulus, psi | Tensile Strength, psi | Elong., % | 300% Modulus, psi | Tensile Strength, psi | Elong., % |
| 16 | 0 | 0 | 0.02 | 1440 | 1440 | >1000 | 180 | 250 | 610 |
| 16-A | 90 | 25.5 | 65.9 | 200 | 1150 | 940 | 40 | 30 | >900 |

EXAMPLE 17

The 20 Mooney (ML, 1 + 8, 212° F.) EPDM described in Example 1 was sulfonated to a sulfonate level of 32 meq. per 100g of base polymer as described in Example 5. The acid was neutralized in solution as described earlier by the addition of zinc acetate at a concentration of 60 meq. per 100g of EPDM. This material was steam stripped, and the resultant wet crumb was dried in a fluidized bed hot air dryer. The resultant product was quite tough even at elevated temperatures, and it was too intractable to be fabricated by rapid polymer processing techniques such as extrusion or injection molding.

The neutralized sulfonated polymer in crumb form was mixed in a beaker with a spatula with stearamide (Eastman Chemical Co.) at a concentration of 60 meq. of stearamide per 100g of gum, or 14 wt. % additive.

probe displacement per minute, and these results were converted to grams per 10 minutes using a conversion factor.

The melt flow rate and tensile properties for the stearamide plasticized lightly sulfonated EPDM are shown in Table XV; properties of the non-plasticized sulfonated EPDM gum are also shown in Table XV for reference.

This example shows that an unplasticized zinc acetate neutralized sulfonated EPDM can be mixed readily and homogeneously with a high concentration of stearamide in a shear intensive mixer to a plasticized gum possessing tremendously improved melt flow rate for much better processability at fabrication temperatures combined with much improved tensile strength at room temperature, and only slightly diminished strength at 70° C.

TABLE XV

PHYSICAL PROPERTIES OF ZINC NEUTRALIZED SULFONATED EPDM MIXED WITH STEARAMIDE IN A BRABENDER MIXING HEAD

| | | | | Tensile Properties | | | | |
|---|---|---|---|---|---|---|---|---|
| | | | | 25° C | | | 70° C | | |
| | Concentration | | Melt Flow Rate | Strength | Elong. | Initial Modulus | Strength | Elong. | Initial Modulus |
| Additive | (meq/100 g) | Wt. Percent | (g/10 min) | (psi) | (%) | (psi) | (psi) | (%) | (psi) |
| None | — | — | 0.007 | 650 | 250 | 385 | 305 | 310 | 310 |
| Stearamide | 60 | 14 | 1.9 | 4,000 | 560 | 950 | 205 | 1100 | 365 |

EXAMPLE 18

A series of long chain amides were incorporated into the non-plasticized lightly sulfonated EPDM prepared in Example 17. The amides used were dodecanamide ($C_{12}$, saturated), behenylamide ($C_{22}$, saturated), and oleamide ($C_{18}$, with unsaturation). Each of the additives was incorporated at a level of 60 meq. per 100g of non-plasticized gum using the procedure described in Example 17. Excellent dispersion of the additive in the non-plasticized gum was achieved in each case. Using the procedures and apparatus described in Example 17, melt flow measurements were made on each of the samples, and tensile measurements were performed on the dodecanamide, oleamide and behenylamide samples. The results are shown in Table XVI.

This example shows that high concentration of long chain amides of varying chain length and also with unsaturation, can be effective in improving properties of sulfonated EPDM. All three of the materials are effective in giving good room temperature tensile strength and excellent melt flow rates. In elevated temperature (70° C.) tensile properties, it is seen that the longer chain and saturated long chain amides here are preferable. In the case of oleamide, its low 70° C. tensile strength is probably caused by its lower melting point as compared with the other materials here.

EXAMPLE 19

An N-substituted amide, stearanilide, was incorporated at a level of 60 meq. per 100g of the gum described in Example 17 according to the procedure of Example 17. The results of melt flow rates and tensile measurements on this sample are shown in Table XVII.

This sample exhibited good melt flow at processing temperature and excellent room temperature tensile properties, as well as still having good tensile strength at 70° C.

TABLE XVII

AMIDES WITH AROMATIC SUBSTITUENTS AS ADDITIVES TO ZINC NEUTRALIZED SULFONATED EPDM[4]

| | | | | Tensile Properties[2] | | | | | |
|---|---|---|---|---|---|---|---|---|---|
| | | | | 25° C | | | 70° C | | |
| | Concentration | | Melt Flow Rate[1] | Tensile Strength | Elong. | Initial Modulus[3] | Tensile Strength | Elong. | Initial Modulus |
| Additive | (meq./100g) | Wt. Percent | (g/10 min.) | (psi) | (%) | (psi) | (psi) | (%) | (psi) |
| Stearanilide | 60 | 17.8 | 2.1 | 2260 | 515 | 985 | 150 | >1100 | 390 |

[1] ASTM 1238-70. Standard Capillary. 190° C, 250 psi.
[2] Microdumbell, about 22 mils thick, 0.1 inch wide, 0.5 inch long straight test region. Pulled at 2 inches/minute.
[3] Modulus determined from initial steepest slope of the stress-strain curve.
[4] Non-plasticized gum is material prepared in Example 17 (zinc acetate neutralized, 32 meq. of sulfonation per 100g of gum).

EXAMPLE 20

Ethylene bis-stearamide (Kemamide W-40) was readily incorporated into the non-plasticized material of Example 17 using a procedure similar to that of Example 17 at a concentration of 15.5 wt. % additive. Melt flow and tensile measurements for this material are shown in Table XVIII. The melt flow rate at 190° C. is fairly good, and the tensile strength at room temperature (25° C.) and 70° C. are very good for this thermoplastic elastomer.

These results show that a bis-amide when used at high concentrations can be very effective in producing excellent properties in sulfonated EPDM.

TABLE XVI

LONG CHAIN AMIDES IN ZINC NEUTRALIZED SULFONATED EPDM[4]

| | | | | Tensile Properties[2] | | | | | |
|---|---|---|---|---|---|---|---|---|---|
| | | | | 25° C | | | 70° C | | |
| | Concentration | | Melt Flow Rate[1] | Tensile Strength | Elong. | Initial Modulus[3] | Tensile Strength | Elong. | Initial Modulus |
| Additive | (meq/100 g) | Wt. Percent | (g/10 min.) | (psi) | (%) | (psi) | (psi) | (%) | (psi) |
| dodecanamide | 60 | 10.7 | 1.1 | 2170. | 500. | 670. | 70. | 710. | 250. |
| behenylamide | 60 | 17.0 | 2.0 | 3920. | 530. | 1180. | 205. | 740. | 385. |
| oleamide | 60 | 14.4 | 1.4 | 1870. | 525. | — | 45. | 760. | 170. |

[1] ASTM 1238-70. Standard Capillary. 190° C. 250 psi.
[2] Microdumbell, about 22 mils thick, 0.1 inch wide, 0.5 inch long straight test region. Pulled at 2 inches/minute.
[3] Modulus determined from initial steepest slope of the stress-strain curve.
[4] Non-plasticized gum is material prepared in Example 17 (zinc acetate neutralized, 32 meq of sulfonation per 100 g of gum).

TABLE XIX

N-ALKYL SUBSTITUTED AMIDES AS ADDITIVES FOR ZINC NEUTRALIZED SULFONATED EPDM[4]

| | Concentration | | Melt Flow Rate[1] (g/10 min.) | Tensile Properties[2] | | | | | |
|---|---|---|---|---|---|---|---|---|---|
| | | | | 25° C | | | 70° C | | |
| Additive | (meq./100 g) | Wt. Percent | | Tensile Strength (psi) | Elong. (%) | Initial Modulus[3] (psi) | Tensile Strength (psi) | Elong. (%) | Initial Modulus (psi) |
| N-methylstearamide | 60 | 15.2 | 1.5 | 2550 | 525 | 785 | 75 | 870 | 180 |
| N,N diethyl-dodecanamide | 60 | 13.3 | 2.5 | 65 | >1000 | 160 | 30 | 675 | 75 |

[1]ASTM 1238-70. Standard Capillary. 190° C, 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.
[4]Non-plasticized gum is material prepared in Example 17 (zinc acetate neutralized, 32 meq. of sulfonation per 100g of gum).

TABLE XVIII

A BIS-AMIDE AS A PLASTICIZER FOR ZINC NEUTRALIZED SULFONATED EPDM[1]

| Additive | Concentration (wt. Percent) | Melt Flow Rate[2] (g/10 min.) | Tensile Strength (psi) | |
|---|---|---|---|---|
| | | | 25° C | 70° C |
| Ethylene bis stearamide[3] | 15.5 | 0.58 | 4000 | 750 |

[1]Non-plasticized gum is material prepared in Example 17 (zinc acetate neutralized, 32 meq. of sulfonation per 100 g of gum).
[2]ASTM 1238-70, Standard Capillary, 190° C, 250 psi.
[3]Kemamide W-40.

EXAMPLE 21

Two N-alkyl substituted amides were incorporated into the non-plasticized lightly sulfonated EPDM prepared in Example 17. These amides were N,N-diethyl-dodecanamide, and N-methylstearamide. Each was incorporated at a level of 60 meq. per 100g of non-plasticized gum using the procedures of Example 17. Good and rapid mixing of the additive into the melt was achieved in each case. Using the methods of Example 17, melt flow rates and tensile measurements were made on both of the samples. The results are shown in Table XIX.

At these high concentrations of near 15 wt. %, both of the additives give excellent melt flow rates. The N-methylstearamide also gives good room temperature tensile strength and a more modest 70° C. tensile strength. On the other hand, the N,N-diethyldodecanamide gives poor room temperature and 70° C. tensile strength; presumably this is because the material is a liquid at room temperature and, therefore, has a weakening effect on the polymer since it cannot phase separate out of the polymer as it cools down to room temperature.

This example shows that at high concentrations N-alkyl substituted amides can be very effective flow improvers at elevated processing temperatures, and that they can also give good tensile properties at these concentrations if they are phase separated from the polymer phase somewhat at the temperature of measurement.

EXAMPLE 22

Plasticized gum compositions containing alkyl chain additives having various different functional groups were prepared, and compared in their melt flow (e.g. processability) and tensile properties. The functional groups included in this example are amide, ester, alcohol, nitrile and ketone, as well as a $C_{18}$ wax for reference. Each material was incorporated in the non-plasticized lightly sulfonated EPDM prepared in Example 17, at a concentration of 60 meq. per 100g of gum. The procedure described in Example 17 was used for incorporating the additives into the non-plasticized gum. The mixes which resulted in very low melt flow rate compositions (see Table XX) were difficult to mix and required longer times (perhaps 10 minutes or slightly longer) in the Brabender mixer. Also, these low melt flow rate compositions tended to mix as chunks rather than forming a coherent sheet or melt within the mixer. For example, the nitrile and ketone plasticized samples were particularly difficult to mix. However, it appeared that adequate dispersion of the additive in each of the samples was accomplished, and the material removed from the mixer appeared to be uniform in all cases. Melt flow rates and tensile measurements were made on each of the samples using the procedures described in Example 17. The results are shown in Table XX.

The five additives with functional groups shown here all have dipole moments well above 0.6 Debyes, so the prior art does not distinguish between which will be the more effective additives; yet, when used at identical molar concentrations there is a difference of roughly a factor of two hundred between the poorest and the best flow improver, which is stearamide. The amide is also clearly outstanding in its 25° C. tensile strength.

These results show that numerous materials having high dipole moments are not very effective additives for sulfonated EPDM. The amides stand out as effective additives for sulfonated EPDM at high concentrations, and their excellent effectiveness as compared with many other functional additives could not be anticipated from the prior art.

TABLE XX

COMPARISON OF VARIOUS FUNCTIONAL GROUPS AS LONG CHAIN ADDITIVES[4]

| | Concentration | | Melt Flow Rate[1] (g/10 min) | Tensile Properties[2] | | | | | |
|---|---|---|---|---|---|---|---|---|---|
| | | | | 25° C | | | 70° C | | |
| Additive | (meq/100 g) | Wt. Percent | | Tensile Strength (psi) | Elong. (%) | Initial Modulus[3] (psi) | Tensile Strength (psi) | Elong. (%) | Initial Modulus (psi) |
| Stearamide | 60 | 14.4 | 1.9 | 4,000 | 560 | 950 | 205 | 1,100 | 365 |
| Methylstearate | 60 | 15.2 | 0.18 | 900 | 610 | 315 | 110 | 580 | 180 |
| Octadecylalcohol | 60 | 13.9 | 0.36 | 1,300 | 490 | 475 | 30 | 590 | 125 |
| Stearonitrile | 60 | 13.7 | 0.15 | 770 | 495 | 370 | 95 | 525 | 135 |

TABLE XX-continued

COMPARISON OF VARIOUS FUNCTIONAL GROUPS AS LONG CHAIN ADDITIVES[4]

| | Concentration | | Melt Flow Rate[1] (g/10 min) | Tensile Properties[2] | | | | | |
|---|---|---|---|---|---|---|---|---|---|
| | | | | 25° C | | | 70° C | | |
| Additive | (meq/ 100 g) | Wt. Percent | | Tensile Strength (psi) | Elong. (%) | Initial Modulus[3] (psi) | Tensile Strength (psi) | Elong. (%) | Initial Modulus (psi) |
| 9-heptadecanone | 60 | 13.3 | 0.05 | 995 | 425 | 470 | 415 | 450 | 425 |
| Octadecane | 60 | 13.3 | 0.19 | — | — | — | 190 | 220 | — |
| None | — | — | 0.007 | 650 | 250 | 385 | 305 | 310 | 310 |

[1]ASTM 1238-70, Standard Capillary 190° C 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.
[4]Non-plasticized gum is material prepared in Example 17 (zinc acetate neutralized, 32 meq. of sulfonation per 100 g of gum).

What is claimed is:

1. An elastomeric composition including:
  (a) a neutralized sulfonated elastomeric polymer having at least about 15 meq neutralized sulfonate groups per 100 grams of said sulfonated elastomeric polymer, said neutralized sulfonate groups being neutralized with metal cations, ammonium ion or amine; and
  (b) at least about 8 parts by weight of an organic amide having the formula

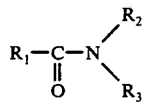

based on 100 parts of said neutralized sulfonated elastomeric polymer, having about 10 to 50 carbon atoms wherein $R_1$ is an aliphatic radical and $R_2$ and $R_3$ are independently selected from the group consisting of H, alkyl, aryl or aralkyl wherein at least one of $R_1$, $R_2$ or $R_3$ has at least about 10 carbon atoms.

2. A composition according to claim 1, wherein said neutralized sulfonated elastomeric polymer is formed from an elastomeric polymer selected from the group consisting essentially of Butyl rubber and an EPDM terpolymer.

3. A composition according to claim 2, wherein said EPDM terpolymer consists essentially of about 40 to about 80 weight percent of ethylene, of about 10 to about 53 weight percent of propylene and of about 1 to about 10 weight percent of a non-conjugated diene.

4. A composition according to claim 3, wherein said non-conjugated diene is selected from the group consisting essentially of 1,4-hexadiene, dicyclopentadiene, alkylidene substituted norbornenes, alkenyl substituted norbornenes, and tetrahydroindene.

5. A composition according to claim 4, wherein said non-conjugated diene is 5-ethylidene-2-norbornene.

6. A composition according to claim 1, wherein said metal cation of said metal neutralized sulfonated polymer is selected from the group consisting essentially of Groups I-A, II-A, I-B, II-B, lead, antimony and iron of the Periodic Table of Elements.

7. A composition according to claim 1, wherein $R_1$ is linear and saturated.

8. A composition according to claim 1, wherein said $R_1$ is saturated linear and at least 16 carbon atoms.

9. A composition according to claim 1, wherein said amide is stearamide.

10. A composition according to claim 1, containing at least 10 parts by weight of said amide.

11. A composition according to claim 1, wherein said amide has a melting point of at least about 35° C.

12. A composition according to claim 9, wherein said metal cation is zinc.

13. A composition according to claim 1, wherein said amide is behenylamide.

14. A composition according to claim 1, wherein said amide is stearanilide.

15. An elastomeric composition including:
  (a) neutralized sulfonated elastomeric polymer having at least about 15 meq. neutralized sulfonate groups per 100 grams of said sulfonated elastomeric/polymer, said neutralized sulfonate groups being neutralized with metal cations; ammonium ion or amines; and
  (b) at least about 8 parts by weight of alkylene bis-amide based on 100 parts of said neutralized sulfonated elastomeric polymer.

16. A composition according to claim 15, wherein said alkylene bis-amide is ethylene bis-stearamide.

17. A composition according to claim 15, wherein said neutralized sulfonated elastomeric polymer is formed from an elastomeric polymer selected from the group consisting essentially of Butyl rubber and an EPDM terpolymer.

18. A composition according to claim 15, wherein said metal cation of said metal neutralized sulfonated polymer is selected from the group consisting essentially of Groups I-A, II-A, I-B, and II-B, lead, antimony and iron of the Periodic Table of Elements.

* * * * *